(12) United States Patent  (10) Patent No.: US 7,927,984 B2
Molnar  (45) Date of Patent: Apr. 19, 2011

(54) SILICON PRODUCTION WITH A FLUIDIZED BED REACTOR UTILIZING TETRACHLOROSILANE TO REDUCE WALL DEPOSITION

(75) Inventor: Michael John Molnar, Freeland, MI (US)

(73) Assignee: Hemlock Semiconductor Corporation, Hemlock, MI (US)

( * ) Notice: Subject to any disclaimer, the term of this patent is extended or adjusted under 35 U.S.C. 154(b) by 209 days.

(21) Appl. No.: 12/265,038

(22) Filed: Nov. 5, 2008

(65) Prior Publication Data

US 2010/0112744 A1    May 6, 2010

(51) Int. Cl.
  *H01L 21/20* (2006.01)
(52) U.S. Cl. ........ 438/503; 438/507; 427/213; 423/341; 423/347
(58) Field of Classification Search .................. 438/478, 438/503, 507; 423/341, 342, 343, 347, 348, 423/349; 427/213
See application file for complete search history.

(56) References Cited

U.S. PATENT DOCUMENTS

| 5,810,934 A * | 9/1998 | Lord et al. ..................... 118/725 |
| 2008/0056979 A1* | 3/2008 | Arvidson et al. ............. 423/350 |
| 2009/0095710 A1* | 4/2009 | Kim et al. ........................ 216/37 |
| 2010/0124525 A1 | 5/2010 | Li |

FOREIGN PATENT DOCUMENTS

WO    2007145474 A1    12/2007

OTHER PUBLICATIONS

JP 57-145021, "Preparation of Silicon Granule", Shin Etsu Chemical Co. Ltd. Abstract only.

* cited by examiner

*Primary Examiner* — Hsien-ming Lee
(74) *Attorney, Agent, or Firm* — Catherine U. Brown

(57) ABSTRACT

Silicon deposits are suppressed at the wall of a fluidized bed reactor by a process in which an etching gas is fed near the wall of the reactor. The etching gas includes tetrachlorosilane. A Siemens reactor may be integrated into the process such that the vent gas from the Siemens reactor is used to form a feed gas and/or etching gas fed to the fluidized bed reactor.

34 Claims, 2 Drawing Sheets

SILICON PRODUCTION WITH A FLUIDIZED BED REACTOR UTILIZING TETRACHLOROSILANE TO REDUCE WALL DEPOSITION

CROSS-REFERENCE TO RELATED APPLICATIONS

None.

STATEMENT REGARDING FEDERALLY SPONSORED RESEARCH

None.

BACKGROUND

It is known that silicon can be made in rod form by a process referred to as the Siemens process. A mixture comprising hydrogen and silane ($SiH_4$) or a mixture comprising hydrogen and trichlorosilane ($HSiCl_3$) is fed to a decomposition reactor containing, seed rods which are kept at a temperature of more than 1000° C. Silicon is deposited on the seed rods and by-product gas mixtures exit in a vent stream. When a mixture comprising hydrogen and trichlorosilane is used, the vent stream may include hydrogen, hydrogen chloride, chlorosilanes, silane, and silicon powder. For purposes of this application, the term 'chlorosilanes' refers to any silane species having one or more chlorine atoms bonded to silicon and includes, but is not limited to monochlorosilane ($H_3SiCl$), dichlorosilane ($H_2SiCl_2$), trichlorosilane ($HSiCl_3$), tetrachlorosilane ($SiCl_4$), and various chlorinated disilanes such as hexachlorodisilane and pentachlorodisilane. For purposes of this application, the term 'silicon monomer' refers to any silane species having one silicon atom per molecule (e.g., silane, or $HSiCl_3$, or a combination of $HSiCl_3$ and $SiCl_4$). In the vent stream, hydrogen and chlorosilanes such as $SiCl_4$ and $HSiCl_3$ may be present both from un-reacted feed gas and reaction product from the decomposition. The vent stream is passed through a complex recovery process where condensations, scrubbing, absorption and adsorption are unit operations often used to facilitate the capture of feed material $HSiCl_3$ and hydrogen for recycle. One problem associated with the Siemens process is that it is difficult to achieve a high yield of polycrystalline silicon product to silicon fed due to the chemical equilibria and kinetics that control this reaction process.

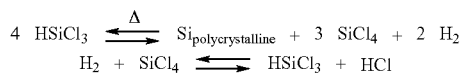

Quite often only 50%, or less, of the maximum theoretical yield of polycrystalline silicon is achieved. Furthermore, the Siemens process requires relatively high energy input to achieve this relatively low yield.

An alternate process is to feed the mixture comprising hydrogen and silane or the mixture comprising hydrogen and trichlorosilane to a fluidized bed containing silicon nearly spherical beads that are maintained also at high temperature. The beads grow in size, and when large enough, are passed out the bottom of the fluidized bed reactor (FBR) as product. The vent gases exit the top of the FBR and are sent through a recovery process similar to the one described above for the Siemens process. Yield in this process may be nearly 90% of theoretical maximum, as compared to the 50% to 70% for the Siemens process.

One problem with the FBR process is that the beads must be heated to a temperature higher than the average bed temperature to facilitate heat transfer. That can be done, for example, by use of a hot walled reactor, microwave energy, radio frequency inductive heating, or infrared radiation. All heating methods have unique operating problems. One problem, however, is that the bottom of the FBR may be hot, and the feed gas is reactive when it contains only $HSiCl_3$ and hydrogen. As a result, the feed gas distributor, clusters of large beads, and reactor side walls are prone to rapid deposition of silicon. Those deposits subsequently disrupt the proper feed distribution, product separation, and heat transfer of the system. Another problem with the FBR process is the product quality is generally insufficient for use in integrated circuit manufacture; however, the product of the FBR process may be used in solar grade applications.

There is a need in the polycrystalline silicon industry to improve efficiency of polycrystalline silicon production with Siemens reactors to reduce by-products and energy consumption. There is a need in the polycrystalline silicon industry to improve FBR technology to prevent silicon deposits from forming on the walls of the FBR.

SUMMARY

A process comprises feeding an etching gas near the wall of a fluidized bed reactor (FBR).

Figure 1:
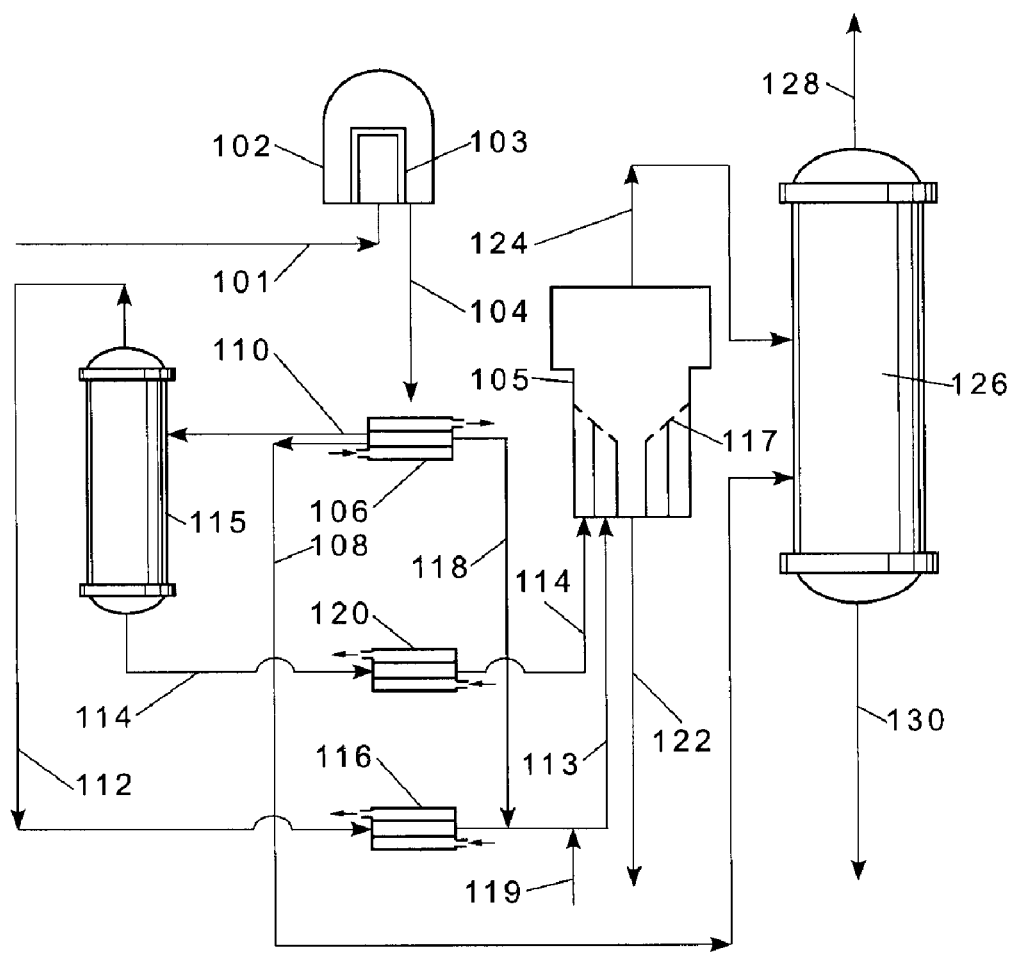
FIG. 1 is a flow diagram of a process described herein.

| Reference Numerals | |
|---|---|
| 101 | Siemens feed gas stream |
| 102 | Siemens reactor |
| 103 | polycrystalline silicon rod |
| 104 | Siemens vent gas stream |
| 105 | fluidized bed reactor |
| 106 | dust removing apparatus |
| 108 | removal line |
| 110 | treated vent gas stream |
| 112 | reactant stream |
| 113 | deposition gas stream |
| 114 | second stream |
| 115 | distillation column |
| 116 | vaporizer |
| 117 | distributor |
| 118 | overhead vapor |
| 119 | supplement stream |
| 120 | vaporizer |
| 122 | product stream |
| 124 | second vent gas stream |
| 126 | recovery system |
| 128 | hydrogen/HCl line |
| 130 | chlorosilanes line |
| 202 | central nozzle |
| 204 | surrounding nozzles |
| 300 | bottom portion of a FBR |
| 301 | silicon particles |
| 302 | product withdrawal tube |
| 303 | injection nozzle |
| 304 | surrounding nozzle |
| 305 | wall of the FBR |
| 306 | horizontal orifice |

DETAILED DESCRIPTION

A process for producing silicon comprises:

1) feeding a deposition gas comprising hydrogen and a silicon monomer into an internal region of a fluidized bed reactor (FBR), and concurrently 2) feeding an etching gas into a surrounding region of the FBR, wherein the surrounding region is between the internal region and a wall of the FBR. In step 1), the silicon monomer may be selected from silane ($SiH_4$) and trichlorosilane ($HSiCl_3$). The deposition gas and the etching gas are introduced in a heating zone of the FBR. The amount of the silicon monomer in step 1) is sufficient to deposit silicon on fluidized silicon particles in a reaction zone located above the heating zone of the FBR. The amount of etching gas in step 2) is sufficient to etch silicon from the wall of the FBR. The etching gas may consist essentially of $SiCl_4$.

In step 2) of the process, the etching gas consisting essentially of $SiCl_4$ is fed into the FBR near the wall of the FBR. The etching gas may be fed through a surrounding region of a distributor at or near the bottom of the FBR thereby minimizing or preventing silicon deposits on the wall. The surrounding region of the distributor is between the internal region and wall of the FBR. Alternatively, the etching gas may be fed directly near the wall of the FBR, thereby minimizing or preventing silicon deposits on the wall. For purposes of this application, 'consisting essentially of $SiCl_4$' means that the etching gas contains a sufficient amount of $SiCl_4$ to locally drive the reaction (described above in background section) to an etch mode. The deposition gas comprising hydrogen and the silicon monomer is fed in an internal region of the FBR. The deposition gas may be optionally be fed through the distributor. The FBR may be integrated with a Siemens reactor such that the etching gas and/or deposition gas entering the FBR are derived from the vent gas from the Siemens reactor.

The exact amount and feed rate of etching gas depends on various factors including the number and configuration of nozzles, the FBR configuration (e.g., diameter and height), and the process conditions to operate the FBR (e.g., temperature and pressure). One skilled in the art would be able to calculate the amount and feed rate of etching gas based on the FBR configuration and process conditions used. For example, at the temperatures and pressures in the process shown in FIG. 1 and described below, the amount of etching gas may be sufficient to provide at least 6 mol % of $SiCl_4$ locally in the presence of hydrogen and silicon. This drives the reaction described above in background section to produce HCl near the wall of the FBR, thereby preventing or minimizing deposition of silicon on the FBR wall without having to dilute the total gas feed (deposition gas and etching gas combined) composition substantially. The exact level of $SiCl_4$ needed near the wall depends upon the concentration of the reactive silicon precursor (silicon monomer) in the deposition gas and its thermodynamic potential to form silicon on the seed particles in the FBR. The amount of $SiCl_4$ is sufficient to provide a blanket of $SiCl_4$ at the wall of the FBR, i.e., an amount of $SiCl_4$ that is sufficient to create etching conditions from the FBR wall to 12 mm inward, and alternatively from the FBR wall to 10 mm inward. Without wishing to be bound by theory, it is thought that extending the blanket further inward, may provide no additional benefit and may reduce capacity of the FBR, but having less may allow silicon to deposit on the FBR wall.

One skilled in the art can calculate the target total gas feed flow rate (of deposition gas and etching gas combined) to achieve fluidization (fluidization velocity) and use this fluidization velocity to calculate the amount of deposition gas fed in the (internal) feed gas nozzle and the amount of $SiCl_4$ to feed in the blanket at the surrounding region and 10 mm to 12 mm inward and some distance upward. This distance upward depends on where silicon deposits form on the wall of the particular FBR. The 6 mol % is based on equilibrium line of etch to deposition conditions of the reaction. When the amount of $SiCl_4$ is 6 mol % or lower, hydrogen will reduce the $SiCl_4$ to deposit silicon. However, when the amount of $SiCl_4$ is above 6%, the reaction will etch silicon (thereby removing silicon from the wall of the FBR) when the FBR is run at pressure conditions of at atmospheric pressure or higher. In this case, the $SiCl_4$ is hydrogenated forming $HSiCl_3$, and the HCl is subsequently consumed to form additional chlorosilanes by reacting with silicon in the proximity of the wall. However, one skilled in the art would recognize that the 6 mol % value may vary depending on other process conditions, e.g., temperature and pressure. For example, see L. P. Hunt and E. Sirtl, "A Thorough Thermodynamic Evaluation of the Silicon-Hydrogen-Chlorine System," *J. Electrochem. Soc.*, Vol. 119, Issue 12, pp. 1741-1745 (December 1972); the amounts of each of these components relative to each other and the temperature determine where the equilibrium line is. The amount of $SiCl_4$ fed is sufficient to create etching conditions at the FBR wall and deposition conditions in as much of the FBR as possible. The deposition gas fed to the FBR may comprise ingredients sufficient to provide 3.0 to 3.3 mol Cl per 1 mol silicon for deposition mode inside the FBR (internal region). At the wall, the etching gas fed to the FBR may comprise ingredients sufficient to provide 3.8 to 4.0 mol Cl per 1 mol Si for etching mode, and a minimum concentration relative to hydrogen of total chlorosilanes of 6 mol % chlorosilanes. The etching gas fed at or near the wall can be pure $SiCl_4$ at wall or $SiCl_4$ mixed with other gases (e.g., diluent gases such as nitrogen or argon), provided total moles of Cl, Si, and H meet the criteria described herein.

FIG. 1 shows an exemplary process flow diagram. A Siemens feed gas stream 101 is fed to a Siemens reactor 102 containing a slim rod. The Siemens feed gas stream 101 comprises $HSiCl_3$ and hydrogen. The slim rod is made of two polycrystalline silicon seed rods connected together by a polycrystalline silicon bridge. Polycrystalline silicon is deposited from the Siemens feed gas stream 101 onto the slim rod to produce polycrystalline silicon product in the form of a U-shaped rod 103. The rod 103 is removed from the Siemens reactor 102 at the end of a batch. The vent gas stream 104 from the Siemens reactor 102 may comprise $HSiCl_3$, $SiCl_4$, hydrogen, HCl, and silicon powder. Without wishing to be bound by theory, it is thought that the walls of a Siemens reactor are cooler by design than walls of a FBR because the Siemens reactor walls are cooled through forced convection of a fluid (air, water, or other heat transfer medium), and this is why the Siemens reactor does not have the problem of silicon deposition on the wall but the FBR does.

The vent gas stream 104 from the Siemens reactor 102 may be treated, for example, by feeding the vent gas stream 104 through a dust removing apparatus 106, which may be cooled with fluid such as service water, thereby removing fine silicon powder through line 108. The dust removing apparatus 106 may comprise a sintered metal blowback filter, a contact condenser, or a combination thereof, for example, a sintered metal blowback filter located either upstream or downstream of a contact condenser (not shown) in the vent gas stream 104 line.

The resulting treated vent gas stream 110 including $HSiCl_3$ and $SiCl_4$ may then be separated in distillation column 115 to form a reactant stream 112 including $HSiCl_3$ and an etching gas stream 114 consisting essentially of SiCl$_4$. The reactant stream 112 may be heated, using for example, a vaporizer 116. The overhead vapor 118 from the contact condenser and/or dust removing apparatus 106 comprises hydrogen and non-condensable chlorosilanes. The overhead vapor 118 and the reactant stream 112 may optionally then be recombined before the reactant stream 112 is fed to the FBR 105. This reactant stream 112 may optionally be supplemented with additional feed gases, with additional gases, or both, in supplement stream 119. The resulting deposition gas stream 113 (which includes hydrogen and HSiCl$_3$) may then optionally be heated in a heater (not shown) and fed to an internal region of a distributor 117, e.g., a distributor plate having nozzles, into the FBR 105. The etching gas 114 may be heated by a vaporizer 120 and fed into a surrounding region of the distributor 117.

Polycrystalline silicon is deposited from the deposition gas stream 113 onto the silicon seed particles. Polycrystalline silicon product in bead form is removed from the FBR 105 in product stream 122. A second vent gas stream 124 comprising hydrogen, HCl, and chlorosilanes, e.g., HSiCl$_3$ and SiCl$_4$, is removed from the FBR 105 and sent to recovery system 126. Hydrogen may be recovered and sent through line 128 to either the Siemens reactor 102 or the FBR 105. Chlorosilanes may be recovered through line 130 and recycled or sold. HCl may be recovered through line 128 and sold. SiCl$_4$ may be recycled to the FBR 105. Alternatively, SiCl$_4$ may be hydrogenated or otherwise converted to HSiCl$_3$, and the resulting HSiCl$_3$ may be recycled to the Siemens reactor 102.

Figure 2:
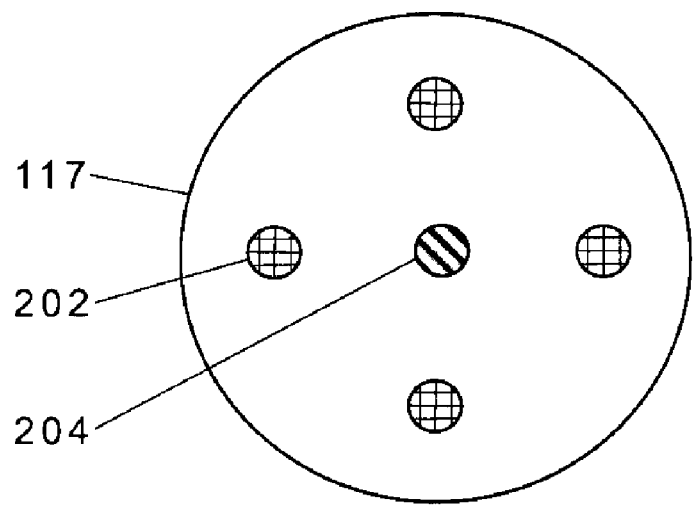
FIG. 2 is a top view of a distributor plate.

FIG. 2 shows a top view of an exemplary distributor plate 117 for use in the FBR 105 in FIG. 1. The distributor plate 117 has a central nozzle 202 in the internal region for introducing the deposition gas stream 113 into the FBR 105 and a plurality of surrounding nozzles 204 for introducing the etching gas stream 114 into the surrounding region of the FBR 105. One skilled in the art would recognize that the nozzle configuration in FIG. 2 is exemplary and not limiting. For example, the internal region nozzle 202 may, or may not, be in the center of the distributor 117; and one or more internal region nozzles 202 may be present. The internal region nozzle 202 may inject the chlorosilanes and hydrogen at or above the distributor plate 117. The surrounding region nozzles 204 may be closer or further away from the internal region nozzle 202. More or fewer surrounding region nozzles 204 may be used. Alternatively, the distributor plate may be eliminated and the same effect may be achieved by introducing the deposition gas stream and etching gas stream through different ports into the FBR 105, as shown below in FIG. 3.

One skilled in the art would recognize that the process description in FIG. 1 is also exemplary and not limiting the scope of the invention set forth in the claims. For example, as an alternative, the vent gas stream 104 from the Siemens reactor 102 may be fed as the deposition gas stream 113 directly to the FBR 105 without intervening treatment steps (without any unit operations between the Siemens reactor 102 and the FBR 105). In this instance, the etching gas fed into the surrounding region nozzles 204 of the distributor plate 117 would be obtained from an alternate source, such as a source including the recovery system 126.

Figure 3:
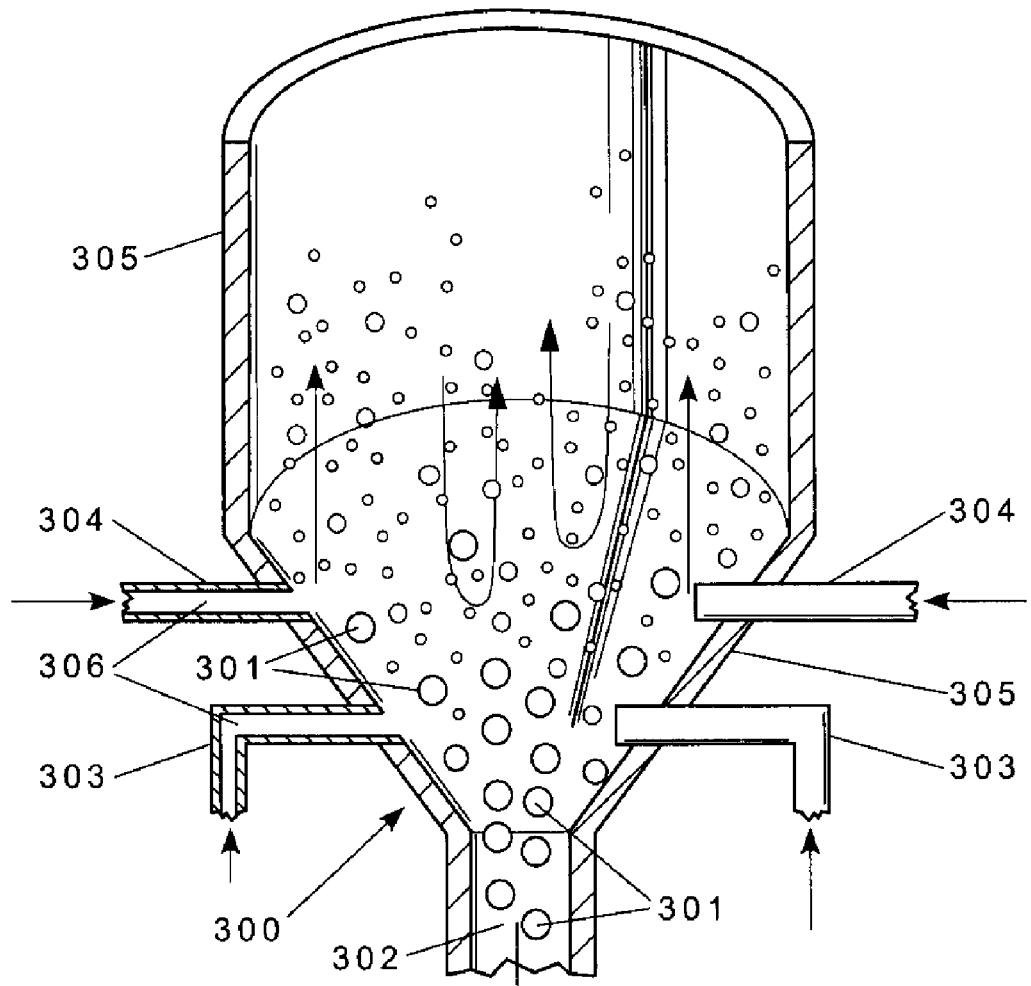
FIG. 3 is a cross sectional view of the bottom of a FBR.

FIG. 3 shows alternative embodiments of a cross section of the bottom portion 300 of a FBR suitable for use herein. The bottom portion 300 of the FBR contains silicon particles 301, which, when large enough, exit through a product withdrawal tube 302. Deposition gas comprising HSiCl$_3$ and hydrogen is fed through one or more injection nozzles 303, 304, which are oriented in a conical grid located above the product withdrawal tube 302. Without wishing to be bound by theory, it is thought that the conical slope of the grid encourages easy draining of the silicon particles 301 while the feed gas (deposition gas and etching gas) injection nozzles 303 are oriented horizontally to reduce the probability for weepage of silicon particles 301 into the feed gas plenum. The angle of the conical grid may be no more than 60 degrees above horizontal, alternatively 20 to 60 degrees above horizontal.

The injection nozzles 303 have horizontal orifices 306, i.e., the orifices are oriented horizontally through the FBR wall 305. Two exemplary embodiments of the horizontal orifices 306 are shown on the left and right sides of the figures, however, one skilled in the art would recognize that these embodiments are exemplary and not limiting. The horizontal orifices 306 may be, for example, holes bored horizontally (306 left) through the wall 305 of the FBR or the horizontal orifices (306 right) may be at the end of nozzles 304 that protrude into the FBR. An etching gas stream consisting essentially of SiCl$_4$ is fed through the surrounding nozzles 304.

Siemens Reactor

The Siemens reactor used in this process may be a conventional Siemens reactor, such as a Siemens reactor disclosed in U.S. Pat. Nos. 2,999,735; 3,011,877; 3,862,020; or 3,961,003. For example, operation of the Siemens reactor may be performed as follows. Polycrystalline silicon seed rods are placed upright and parallel to one another in the Siemens reactor. Two or more of these seed rods may be connected to one another by a bridge, thereby forming a U-rod. The U-rods are heated until they reach a temperature ranging from 700° C. to 1,400° C., alternatively 1,000° C. to 1,200° C., alternatively 1,100° C. to 1,150° C. The Siemens reactor may be operated at a pressure ranging from 13 kPa (2 psig) to 3450 kPa (500 psig), alternatively 6 kPa (1 psig) to 1380 kPa (200 psig), and alternatively 100 kPa (1 bar) to 690 kPa (100 psig).

The Siemens feed gas is fed to the Siemens reactor through an inlet in the base. The Siemens feed gas may comprise hydrogen and HSiCl$_3$. The Siemens feed gas may optionally further comprise SiCl$_4$. Silicon is deposited from the feed gas onto the U-rod, thereby increasing the diameter of the U-rod. The Siemens feed stream may comprises 5% to 75% HSiCl$_3$. The Siemens feed gas may comprise 0.015 moles of HSiCl$_3$ per mole of hydrogen to 0.3 moles of HSiCl$_3$ per mole of hydrogen. Alternatively, the Siemens feed gas may comprise 0.03 moles of HSiCl$_3$ per mole of hydrogen to 0.15 moles of HSiCl$_3$ per mole of hydrogen. Without wishing to be bound by theory, it is thought that the amount of polycrystalline silicon product ranging from 20% to 50%, alternatively 20% to 40%, based on the total quantity of silicon contained in the Siemens feed gas may be obtained from the Siemens reactor.

Fluidized Bed Reactor

The FBR used in this invention may be a conventional FBR, such as a FBR disclosed in U.S. Pat. No. 5,077,028. For example, operation of the FBR may be performed as follows. Seed particles of silicon are placed in a FBR and fluidized. Sources of seed particles are known in the art. For example, seed particles may be obtained by mechanical attrition of granular polycrystalline silicon or by crushing polycrystalline silicon produced in a Siemens reactor. The gas used to fluidize the bed (fluidizing gas) may comprise a diluent gas such as hydrogen, argon, helium, nitrogen, or a combination thereof. Alternatively, the fluidizing gas and/or the reactant gas (which make up the deposition gas stream 113) may be derived from a vent gas stream from a Siemens reactor, e.g., the deposition gas stream may comprise all or a portion of the vent gas stream from a Siemens reactor. Alternatively, the fluidizing gas may comprise a combination of a diluent gas and all or a portion of the vent gas stream from a Siemens reactor. Silicon is deposited on the surface of the seed particles, increasing their diameters. The resulting product in bead form may be removed from the fluidized bed, and more seed particles may be introduced.

An etching gas is introduced near the wall of the FBR. The etching gas consists essentially of $SiCl_4$. The etching gas may optionally further include a diluent gas (such as nitrogen or argon), or any other gas that does not shift the equilibrium of the reaction described above background section to a deposition mode. Without wishing to be bound by theory, it is thought that the etching gas drives the reaction near the wall of the FBR to an etch mode rather than a deposition mode. The local etch mode prevents and/or removes silicon deposits on the wall of the FBR.

The temperature inside the FBR may range from 900° C. to 1410° C., alternatively 1100° C. to 1300° C., and alternatively 1100° C. to 1250° C. The pressure inside the FBR may be at least 2 atmospheres, alternatively 5 atmospheres to 15 atmospheres, and alternatively 5 to 8 atmospheres. One skilled in the art would recognize that the upper limit may be exemplary and not limiting based on the chemistry; however, it may be impractical to build a FBR that operates at a pressure greater than 15 atmospheres.

Feeding the vent gas stream from the Siemens reactor directly into the FBR may offer the advantage of energy savings by having to provide less heat to the FBR. Alternatively, the vent gas stream from the Siemens reactor may optionally be supplemented with additional $HSiCl_3$. The concentration of chlorosilanes in the feed stream to the FBR may range from 20 mol % to 50 mol %, alternatively 25 mol % to 35 mol %. Without wishing to be bound by theory, it is thought that excessive amounts of fine powder may form if the concentration of chlorosilanes is higher than 50%. The average diameter of the fluidized silicon particles may range from 0.5 mm to 4 mm, alternatively 0.6 mm to 1.6 mm. The residence time of gas in the bed of fluidized particles may range from 0.5 second to 4 seconds, alternatively 0.5 second to 2 seconds.

The minimum fluidization velocity and design operational velocity may be determined by one of ordinary skill in the art based on various factors. The minimum fluidization velocity may be influenced by factors including gravitational acceleration, fluid density, fluid viscosity, solids density, and solids particle size. The operational velocity may be influenced by factors including heat transfer and kinetic properties, such as height of the fluidized bed, total surface area, flow rate of silicon precursor in the feed gas stream, pressure, gas and solids temperature, concentrations of species, and thermodynamic equilibrium point.

In the regime of silicon particle size described above, the bed falls into the regime of Geldart group B particles with the largest particles falling into Geldart group D. Beds of Geldart group B particles characteristically tend to form relatively large bubbles which grow as they rise from the injection points. As these bubbles rise, they cause local recirculation of solids in the emulsion phase of the bed. This action tends to be centered in the interior of the bed, thus inducing mixing of the emulsion phase. However, near the periphery of the bed, less bubble rise occurs, and the solids motion induced by the bubble is not nearly as dominant as what occurs near the center due to drag of the wall. This feature allows the inventor to take advantage of the natural permeability of the bed such that the injection of $SiCl_4$ near the wall will tend to rise preferentially up the periphery of the wall, thus blanketing a zone of particles and the wall with a less reactive feed composition.

One skilled in the art will recognize that the Siemens reactor operates in a batch process, and the FBR operates in a continuous process. Furthermore, the vent gas stream composition leaving the Siemens reactor may vary during the course of a batch. Therefore, one skilled in the art would recognize that vent gases from multiple (two or more) Siemens reactors may be combined to form a vent gas stream fed directly or indirectly to the FBR as the deposition gas, or the deposition gas stream fed to the FBR may be supplemented with additional $HSiCl_3$, $SiCl_4$, hydrogen, or a combination thereof, for example, to minimize variability of the deposition gas stream fed to the FBR. Furthermore, the vent gas stream from the Siemens reactor may be fed to one or more fluidized bed reactors configured in parallel. Without wishing to be bound by theory, it is thought that supplementing the deposition gas stream with a chlorosilane comprising $HSiCl_3$ may increase silicon production rate. Without wishing to be bound by theory, it is thought that supplementing the feed gas stream (e.g., the deposition gas stream 113, the etching gas stream 114, or both, shown for example in FIG. 1) to the FBR with $SiCl_4$ may prevent undesired deposition such as on the FBR walls, heater walls, and feed distributor 117.

Without wishing to be bound by theory, the FBR may have deposition of the difference of yield, 90% to 50%, or 40% of theoretical maximum. Without wishing to be bound by theory it is thought that another advantage of this process is that the partially-converted feed gases from the Siemens reactor are of a composition that is not able to deposit silicon at temperatures below 1250° C. at atmospheric pressure. That detail allows for design of heating system by a hot wall reactor, resistively-heated feed tube, or other means more efficient than commonly used in a FBR process.

For purposes of this application, the disclosure of ranges includes the range itself and also anything subsumed therein, as well as endpoints. For example, disclosure of a range of 700 to 1,400 includes not only the range of 700 to 1,400, but also 700, 850, 1000 and 1,400 individually, as well as any other number subsumed in the range. Furthermore, disclosure of a range of, for example, 700 to 1,400 includes the sub ranges of, for example, 1,000 to 1,400 and 1,000 to 1,100, as well as any other sub range subsumed in the range. Similarly, the disclosure of Markush groups includes the entire group and also any individual members and subgroups subsumed therein. For example, disclosure of the Markush group hydrogen, $HSiCl_3$, $SiCl_4$, and HCl includes the member hydrogen individually; the subgroup $HSiCl_3$ and $SiCl_4$; and any other individual member and subgroup subsumed therein. For purposes of this application, the articles 'a', 'an' and 'the' may each refer to one or more.

Recovery System

The vent gas stream from the FBR may be recovered by any conventional means. The vent gas stream from the FBR may be cooled using conventional equipment. Fine silicon powder may be removed using conventional equipment such as a contact condenser, sintered metal blowback filtration assembly, or a combination of a cyclone and filter assembly.

Alternatively, the vent gas stream from the FBR may be fed to a contact condenser to knock down the solids in liquid chlorosilanes and thereafter the fine silicon powder may be dried, e.g., in a spray dryer. The resulting silicon powder may be neutralized and sold. Alternatively, the fine silicon powder and chlorosilanes may be recovered and converted to chlorosilanes for use as a feed stream to the Siemens reactor. One skilled in the art would be able to select a suitable recovery system without undue experimentation.

INDUSTRIAL APPLICABILITY

Without wishing to be bound by theory, it is thought that the etching gas fed near the FBR wall will locally shift the reaction from a deposition mode to an etch mode. However, because the contribution of the etching gas is small relative to the overall feed rate of gases into the FBR, the bulk of the chemistry in the FBR remains in a deposition mode. Without wishing to be bound by theory, it is thought that the FBR can operate with more reactive deposition gas fed to the internal region of the fluidized bed without producing excessive amounts of dust and with reduced growth silicon on the wall as compared to FBRs without an etching gas fed near the wall. Furthermore, the process described herein may allow the FBR to operate in a true continuous mode for an extended period of time, i.e., the deposition of silicon does not have to be stopped or slowed in order to etch silicon deposits from the walls or other internals of the FBR.

The combined benefits of no duplicity of feed and recovery systems and easier heating of the process may make the integral FBR with a Siemens reactor process more manageable and economic. The polycrystalline silicon product of the Siemens reactor may be suitable for either solar cell or integrated circuit applications. The polycrystalline silicon product of the FBR may be suitable for solar cell applications.

One skilled in the art would recognize that the disclosure above relating to $SiCl_4$ and other chlorosilanes is exemplary and not limiting. Other halosilane systems could be used in the process and FBR of this invention; for example, the silicon monomer may comprise silane or a halosilane such as a chlorosilane or a bromosilane. In this instance, the etching gas may alternatively consist essentially of tetrabromosilane when the deposition gas comprises tribromosilane.

The invention claimed is:

1. A process comprising:
    1) feeding a deposition gas comprising hydrogen and a silicon monomer into an internal region of a fluidized bed reactor, where the silicon monomer is selected from $SiH_4$ and $HSiCl_3$ and the deposition gas is introduced in a heating zone of the fluidized bed reactor, and concurrently
    2) feeding an etching gas consisting essentially of $SiCl_4$ into the heating zone of the fluidized bed reactor through a surrounding region, wherein the surrounding region is between the internal region and a wall of the fluidized bed reactor;
    wherein the amount of the silicon monomer in step 1) is sufficient to deposit silicon on fluidized silicon particles in a reaction zone located above the heating zone of the fluidized bed reactor, and the amount of $SiCl_4$ in step 2) is sufficient to etch silicon from the wall of the fluidized bed reactor; and, where a vent gas stream from one or more Siemens reactors is separated in equipment comprising a distillation column to form at least a portion of the deposition gas and at least a portion of the etching gas, after leaving the one or more Siemens reactors and before entering the fluidized bed reactor.

2. The process of claim 1, further comprising supplementing the deposition gas with an additional chlorosilane species.

3. The process of claim 2, where the additional chlorosilane species comprises $HSiCl_3$, $SiCl_4$, or a combination thereof.

4. The process of claim 1; further comprising using silicon produced by the one or more Siemens reactors for integrated circuits, for solar cells, or both.

5. The process of claim 1; further comprising using silicon produced by the fluidized bed reactor for solar cells.

6. The process of claim 1, where the vent gas stream comprises $HSiCl_3$, $SiCl_4$, hydrogen, HCl and silicon powder, and the process further comprises removing silicon powder from the vent gas stream before feeding the vent gas stream as the deposition gas to the fluidized bed reactor.

7. The process of claim 1, where the vent gas stream is optionally supplemented with additional $HSiCl_3$ to form the deposition gas, and the deposition gas comprises a concentration of chlorosilanes ranging from 20 mol % to 50 mol %.

8. The process of claim 7, where the concentration of chlorosilanes ranges from 25 mol % to 35 mol %.

9. The process of claim 1, further comprising: step 3) feeding a second vent gas stream from the fluidized bed reactor to a recovery system.

10. The process of claim 9, where the second vent gas stream comprises: hydrogen, $HSiCl_3$, $SiCl_4$, and HCl.

11. The process of claim 10, further comprising: step 4) recovering hydrogen, $HSiCl_3$, $SiCl_4$, or a combination thereof from the recovery system.

12. The process of claim 11, further comprising: step 5) feeding the hydrogen, $HSiCl_3$, or both, to the one or more Siemens reactors.

13. The process of claim 11, further comprising: step 5) adding the hydrogen, $HSiCl_3$, or both to the deposition gas in step 1).

14. The process of claim 11, further comprising adding the $SiCl_4$ recovered in step 4) to the etching gas in step 2).

15. The process of claim 9, further comprising: step 4) recovering $SiCl_4$, converting the $SiCl_4$, to $HSiCl_3$, and feeding the $HSiCl_3$ to the one or more Siemens reactors or the fluidized bed reactor.

16. A method comprising:
    1) feeding a deposition gas comprising hydrogen and a silicon monomer into an internal region of a fluidized bed reactor, where the silicon monomer is selected from $SiH_4$ and $HSiCl_3$ and the deposition gas is introduced in a heating zone of the fluidized bed reactor, and concurrently
    2) feeding an etching gas consisting essentially of $SiCl_4$ into the heating zone of the fluidized bed reactor through a surrounding region, wherein the surrounding region is between the internal region and a wall of the fluidized bed reactor; and
    wherein the amount of the silicon monomer in step 1) is sufficient to deposit silicon on fluidized silicon particles in a reaction zone located above the heating zone of the fluidized bed reactor, and the amount of $SiCl_4$ in step 2) is sufficient to etch silicon from the wall of the fluidized bed reactor; where
    the fluidized bed reactor comprises a bottom portion comprising injection nozzles oriented in a conical grid,
    the injection nozzles have horizontal orifices,
    the deposition gas and the etching gas are introduced into the fluidized bed reactor through the injection nozzles,
    the conical grid facilitates easy draining of the silicon particles, and
    the horizontal orifices reduce weepage of the silicon particles into a feed gas plenum.

17. The method of claim 16, where the conical grid has an angle 20 to 60 degrees above horizontal.

18. The method of claim 16, where the horizontal orifices are selected from:
    holes bored horizontally through a wall of the fluidized bed reactor and
    ends of nozzles that protrude into the fluidized bed reactor.

19. The method of claim 16, where the deposition gas is derived from a vent gas stream from a Siemens reactor.

20. The method of claim 19, where the vent gas stream comprises $HSiCl_3$, $SiCl_4$, hydrogen, HCl and silicon powder, and the process further comprises removing silicon powder from the vent gas stream before feeding the vent gas stream as the deposition gas to the fluidized bed reactor.

21. The method of claim 19, where the vent gas stream is optionally supplemented with additional $HSiCl_3$ to form the deposition gas, and the deposition gas comprises a concentration of chlorosilanes ranging from 20 mol % to 50 mol %.

22. The method of claim 21, where the concentration of chlorosilanes ranges from 25 mol % to 35 mol %.

23. The method of claim 16, where a vent gas stream from one or more Siemens reactors is separated to form at least a portion of the deposition gas and at least a portion of the etching gas, after leaving the one or more Siemens reactors and before entering the fluidized bed reactor.

24. The method of claim 23, further comprising supplementing the deposition gas with an additional chlorosilane species.

25. The method of claim 24, where the additional chlorosilane species comprises $HSiCl_3$, $SiCl_4$, or a combination thereof.

26. The method of claim 23; further comprising using silicon produced by the one or more Siemens reactors for integrated circuits, for solar cells, or both.

27. The method of claim 16; further comprising using silicon produced by the fluidized bed reactor for solar cells.

28. The method of claim 16, further comprising: step 3) feeding a second vent gas stream from the fluidized bed reactor to a recovery system.

29. The method of claim 28, where the second vent gas stream comprises: hydrogen, $HSiCl_3$, $SiCl_4$, and HCl.

30. The method of claim 29, further comprising: step 4) recovering hydrogen, $HSiCl_3$, $SiCl_4$, or a combination thereof from the recovery system.

31. The method of claim 30, further comprising: step 5) feeding the hydrogen, $HSiCl_3$, or both, to the one or more Siemens reactors.

32. The method of claim 30, further comprising: step 5) adding the hydrogen, $HSiCl_3$, or both to the deposition gas in step 1).

33. The method of claim 30, further comprising adding the $SiCl_4$ recovered in step 4) to the etching gas in step 2).

34. The process of claim 28, further comprising: step 4) recovering $SiCl_4$ from a recovery system, converting the $SiCl_4$, to $HSiCl_3$, and feeding the $HSiCl_3$ to the one or more Siemens reactors or the fluidized bed reactor.

* * * * *